(12) United States Patent
Van Der Lee et al.

(10) Patent No.: US 10,866,083 B2
(45) Date of Patent: Dec. 15, 2020

(54) LASER SENSOR FOR PARTICLE DENSITY DETECTION

(71) Applicant: TRUMPF PHOTONIC COMPONENTS GMBH, Ulm (DE)

(72) Inventors: Alexander Marc Van Der Lee, Eindhoven (NL); Joachim Wilhelm Hellmig, Eindhoven (NL); Johannes Hendrikus Maria Spruit, Eindhoven (NL); Holger Moench, Eindhoven (NL); Cornelis Reinder Ronda, Eindhoven (NL); Koray Karakaya, Eindhoven (NL)

(73) Assignee: TRUMPF PHOTONIC COMPONENTS GMBH, Ulm (DE)

( * ) Notice: Subject to any disclaimer, the term of this patent is extended or adjusted under 35 U.S.C. 154(b) by 347 days.

(21) Appl. No.: 15/745,144

(22) PCT Filed: Jul. 14, 2016

(86) PCT No.: PCT/EP2016/066754
§ 371 (c)(1),
(2) Date: Jan. 16, 2018

(87) PCT Pub. No.: WO2017/016888
PCT Pub. Date: Feb. 2, 2017

(65) Prior Publication Data
US 2018/0209779 A1 Jul. 26, 2018

(30) Foreign Application Priority Data
Jul. 30, 2015 (EP) .................................. 15179046

(51) Int. Cl.
*G01P 3/36* (2006.01)
*G01B 9/02* (2006.01)
(Continued)

(52) U.S. Cl.
CPC ......... *G01B 9/02092* (2013.01); *G01N 15/06* (2013.01); *G01N 15/1434* (2013.01);
(Continued)

(58) Field of Classification Search
CPC .......... G01S 17/32; G01S 17/58; G01S 17/95; G01S 17/87; G01S 7/4802; G01S 7/4916; G01S 7/4817
(Continued)

(56) References Cited

U.S. PATENT DOCUMENTS 5,296,910 A   3/1994 Cole
5,587,785 A   12/1996 Kato et al.
(Continued)

FOREIGN PATENT DOCUMENTS

CN   1194056 A   9/1998
CN   1789971 A   6/2006
(Continued)

OTHER PUBLICATIONS

Giuliani et al,"Laser Diode Self-Mixing Technique for Sensing Applications" Journal of Optics A. Pure and Applied Optics, 2002 p. 283-294.

*Primary Examiner* — Mark Hellner
(74) *Attorney, Agent, or Firm* — Leydig, Voit & Mayer, Ltd.

(57) ABSTRACT

The invention describes a laser sensor module (100) for particle density detection. The laser sensor module (100) comprising at least one first laser (110), at least one first detector (120) and at least one electrical driver (130). The first laser (110) is adapted to emit first laser light in reaction to signals provided by the at least one electrical driver (130). The at least one first detector (120) is adapted to detect a first self-mixing interference signal of an optical wave within a first laser cavity of the first laser (110). The first self-mixing
(Continued)

interference signal is caused by first reflected laser light reentering the first laser cavity, the first reflected laser light being reflected by a particle receiving at least a part of the first laser light. The laser sensor module (100) is adapted to reduce multiple counts of the particle. The invention further describes a related method and computer program product.

16 Claims, 5 Drawing Sheets

(51) Int. Cl.

| | | |
|---|---|---|
| G01S 17/32 | (2020.01) | |
| G01S 17/58 | (2006.01) | |
| G01S 17/95 | (2006.01) | |
| G01S 7/48 | (2006.01) | |
| G01S 7/4912 | (2020.01) | |
| G01S 17/87 | (2020.01) | |
| G01S 7/481 | (2006.01) | |
| G01N 15/14 | (2006.01) | |
| G01N 15/06 | (2006.01) | |
| G01N 15/10 | (2006.01) | |
| G01N 15/00 | (2006.01) | |

(52) U.S. Cl.
CPC ........ *G01N 15/1456* (2013.01); *G01S 7/4802* (2013.01); *G01S 7/4817* (2013.01); *G01S 7/4916* (2013.01); *G01S 17/32* (2013.01); *G01S 17/58* (2013.01); *G01S 17/87* (2013.01); *G01S 17/95* (2013.01); G01N 2015/0046 (2013.01); G01N 2015/0693 (2013.01); G01N 2015/1075 (2013.01); G01N 2015/1454 (2013.01); Y02A 90/10 (2018.01)

(58) Field of Classification Search
USPC ........................................................ 356/28.5
See application file for complete search history.

(56) References Cited

U.S. PATENT DOCUMENTS

| | | | |
|---|---|---|---|
| 5,946,092 | A | 8/1999 | Defreez et al. |
| 6,091,905 | A | 7/2000 | Yahav et al. |
| 6,233,045 | B1 | 5/2001 | Suni et al. |
| 7,430,046 | B2 | 9/2008 | Jiang et al. |
| 9,354,315 | B2 * | 5/2016 | Lepaysan ............. G01P 5/26 |
| 2006/0152722 | A1 | 7/2006 | Northby |
| 2010/0328680 | A1 * | 12/2010 | Moench ............. G01S 7/4811 356/615 |
| 2011/0007299 | A1 | 1/2011 | Moench et al. |
| 2011/0184624 | A1 | 7/2011 | Han et al. |
| 2012/0242976 | A1 | 9/2012 | Lepaysan et al. |
| 2013/0226508 | A1 | 8/2013 | Carpaij et al. |
| 2014/0152986 | A1 | 6/2014 | Trainer |
| 2015/0077735 | A1 | 3/2015 | Zamama et al. |

FOREIGN PATENT DOCUMENTS

| | | |
|---|---|---|
| CN | 101072995 A | 11/2007 |
| CN | 101726452 A | 6/2010 |
| CN | 102089645 A | 6/2011 |
| CN | 102564909 B | 5/2014 |
| JP | 2011007299 A | 1/2011 |
| RU | 2013125462 A | 12/2014 |
| WO | 200237410 A1 | 5/2002 |
| WO | WO 2014146051 A1 | 9/2014 |

* cited by examiner

Fig. 10

LASER SENSOR FOR PARTICLE DENSITY DETECTION

CROSS-REFERENCE TO PRIOR APPLICATIONS

This application is the U.S. National Phase application under 35 U.S.C. § 371 of International Application No. PCT/EP2016/066754, filed on Jul. 14, 2016, which claims the benefit of EP Patent Application No. EP 15179046.6, filed on Jul. 30, 2015. These applications are hereby incorporated by reference herein.

FIELD OF THE INVENTION

The invention relates to a laser sensor or laser sensor module using self-mixing interference for particle density detection and a related method of particle density detection.

BACKGROUND OF THE INVENTION

CN102564909 A discloses laser self-mixing multi-physical parameter measurement method and a laser self-mixing multi-physical parameter measurement device for an atmospheric particulate is disclosed. The laser self-mixing multi-physical parameter measurement device comprises a microchip laser, a collimating lens, a beam splitter, converging lenses, a photodetector, an amplifier, a data acquisition card and a spectrum analyzer. The described methods and devices are complicated and expensive.

US 2012/0242976 A1 discloses a device comprising: an emitting element for emitting a laser beam, referred to as an emitted beam; a focusing element for focusing the emitted beam at a predetermined focal distance (D); a receiving element for receiving the emitted beam after being reflected by a particle in the air, referred to as a reflected beam; a transmitting element for transmitting the signal of interference occurring between the emitted beam and the reflected beam to a signal processor in order to deduce the speed of the particle therefrom. The emitting element includes a laser diode and the receiving element is combined with the laser diode by self-mixing.

SUMMARY OF THE INVENTION

It is an object of the present invention to provide an improved laser sensor module for particle density detection.

According to a first aspect a laser sensor module for particle density detection is presented. The laser sensor module comprises at least one first laser, at least one first detector and at least one electrical driver. The first laser is adapted to emit first laser light in reaction to signals provided by the at least one electrical driver. The at least one first detector is adapted to detect a first self-mixing interference signal of an optical wave within a first laser cavity of the first laser. The first self-mixing interference signal is caused by first reflected laser light reentering the first laser cavity, the first reflected laser light being reflected by a particle receiving at least a part of the first laser light. The laser sensor module is adapted to reduce multiple counts of the particle.

In case no movable mirror is used, or more generally speaking the air stream or movement in front of the laser sensor module is not controlled, the sampled air volume is not a priori known, and a particle that is in the measurement volume of the particle detector can be measured more than once due to vortices in the air stream that let the particle circulate in and out the measurement volume. Such double or even multiple counts of the same particles would result in particle density which is too high. Technical measures to avoid or at least reduce multiple counts (includes double counts) are therefore proposed in order to provide a particle density with acceptable accuracy. Such technical measures are, for example, an array of lasers increasing the sampling volume in combination with the evaluation electronics like a controller. The controller may be adapted to determine multiple counts by means of measurements results provided by means of the laser array and a model of particle movement. Alternatively, refreshment of air may be enabled by switching off the laser or interrupt measurement of particles. Accuracy of particle density detection by means of laser self-mixing interference can be improved by these measures, a combination thereof and further measures as described below. The first laser is preferably a semiconductor laser like an edge emitting laser or a Vertical Cavity Surface Emitting Laser (VCSEL). The first laser may preferably adapted to emit laser light with wavelength above 750 nm in the infrared range of the spectrum, most preferably between 780 nm and 1300 nm of the wavelength spectrum.

The laser sensor module may for example be used in order to detect or estimate air pollution. The laser sensor module may alternatively be used in industrial applications in which an estimation of particle density may be relevant. The laser sensor module may be a separate device or integrated in another device.

The laser sensor module may, for example, be adapted to interrupt detection of particles for a predetermined time period. The predetermined time period is preferably selected such that multiple detection of the particle is reduced in order to reduce multiple counts of the particle. The predetermined time is preferably significantly longer than the time needed for air to refresh the measurement volume. Minimal airspeed in a room is, for example, around 0.1 m/s. Typical dimensions of the measurement spot which is used to determine the first self-mixing interference signal may be, for example, 10 µm×10 µm×200 µm. The time needed for a particle to pass the volume of the measurement spot is at least 200 µm/0.1 m/s=2 ms. The predetermined time of switching the laser off should be significantly longer than 2 ms. The on time of the laser sensor module is preferably so short that the air volume is not refreshed. The laser sensor module probes in this case basically the measurement volume and observes whether a particle is present. As the presence of the particle in the measurement volume is a stochastic process, one can determine experimentally the chance of a particle being present in the measurement volume. The at least one electrical driver or the first detector may be adapted to periodically interrupt the detection of particles by means of the first self-mixing interference signal. The electrical driver may, for example, subsequently switch on the first laser for 0.25 ms interrupted by periods of 3 ms in which the first laser is switched off.

The laser sensor module may further comprise a controller. The controller may be adapted to evaluate the first self-mixing interference signal provided by the sensor in order to count the particle, and wherein the controller is adapted to interrupt the detection of particles. The controller may, for example, be adapted to interrupt evaluation of the first self-mixing interference signal provided by the first sensor for the predetermined time period. The controller may be adapted to generate a control signal upon detection of the particle. The controller may be further adapted to interrupt the detection of particles for the predetermined time period after detection of the particle. The controller may, for example, interrupt signal transfer from first detector to the controller. Alternatively, the controller may be adapted to transfer the control signal to the electrical driver. The electrical driver may in this case be adapted to interrupt the emission of first laser light upon reception of the control signal for the predetermined time period.

Beam divergences of the first laser light may be low such that focusing of the first laser light is not necessary in order to get the first self-mixing interference signal. The laser sensor module may in an alternative approach comprise at least a first optical device. The first optical device may be adapted to focus the first laser light to a first focus region for detecting the particle. Focusing of the first laser light may increase the intensity of the first reflected laser light re-entering the first laser cavity. Signal strength of the first self-mixing interference signal may therefore be increased.

The laser sensor module may comprise in an alternative approach a laser array. The laser array may comprise at least the first laser and a second laser. The laser sensor module may further comprise a controller. The second laser may be adapted to enable independent detection of the particle by means of a second self-mixing interference signal caused by second laser light emitted by the second laser. The controller may be adapted to reduce multiple counts of the particle by evaluation of at least the first self-mixing interference signal and the second self-mixing interference signal. The reduction of multiple counts of the particle may be done by means of a theoretical model of particle movement stored, for example, in the controller. The theoretical model may enable to determine coincidences of detection of one particle by means of the at least first and second laser.

The first self-mixing interference signal and this second self-mixing interference signal may be measured by one common first detector. A second detector may be provided in an alternative approach in order to provide independent detectors for detecting the first and the second self-mixing interference signal. The laser sensor module may comprise at least a first optical device. The first optical device may be the adapted to focus at least the first laser light to a first focus region and the second laser light to a second focus region such that a detection volume for detecting the particle density is increased. The first optical device may, for example, be a lens array or array of micro-lenses. An array of micro-lenses may, for example, be used if the laser array comprises a single chip of semiconductor lasers. The semiconductor lasers may, for example, be Vertical Cavity Surface Emitting Lasers (VCSEL).

The laser sensor module may further comprise at least a first movable mirror for reflecting at least the first and the second laser light such that at least the first and the second focus region move. The first movable mirror may be adapted to move at least the first and the second focus region such that traces of the first and the second focus region do not overlap. It may be advantageous to have the line of the lasers not parallel to the scan direction of the movable mirror such that each focus region or measurement spot probes a different volume of space. The different volumes of space are given by the trace of the respective focus region.

One common detector, for example the first detector may be used to detect the first self-mixing interference signal, the second self-mixing interference signal and further self-mixing interference signals which may be generated by a third, fourth, fifth etc. laser of the laser array. Using one common detector may cause multiple particle detection of different particles at one moment in time. Discrimination of this multitude of self-mixing interference signals may be difficult or a more sophisticated controller may be used. The controller may, for example, be adapted to switch off at least a part of the lasers comprised by the laser array by means of the electrical driver depending on the particle density. The controller may especially be adapted to control the electrical driver such that a number of lasers of the laser array emitting laser light is continuously reduced when the determined particle density rises continuously. The number of lasers operating may be reduced in a way, to achieve the situation that only one particle is counted in one instant of time. More general, an algorithm can be applied that determines the optimal number of lasers used in dependence of the detected particle concentration. Low concentrations result in a larger number of lasers used, with higher noise but a larger volume being scanned. High concentrations result in a small(er) number of lasers being used, with a lower noise and a smaller volume being scanned. Detection speed and accuracy may be improved by these measures.

The controller may alternatively or in addition be adapted to determine a projection of a first velocity of the particle along an optical axis parallel to the first or second laser light based on the first or second self-mixing interference signal. The controller may be further adapted to reduce multiple counts of the particle using the first velocity. The first velocity may be used to provide an estimate of air movement. One way to obtain this estimate would be via using the Doppler shift present in the detected first or second self-mixing interference signal. The Doppler shift may give an estimate for the movement of the particle and of the air stream containing the particle. Not the full velocity vector can be determined but only the projection on the laser beam propagation direction of the first or second laser light. Alternatively the air movement can be monitored with an additional sensor. For example when jogging the laser sensor module counts the particle and velocity information may come from the app that tracks the velocity of the runner, or via average wind speed measured at the closest weather station. Determining the first velocity can be used to reduce multiple counts of particles if there is only one first laser with corresponding first detector or if there are a multitude of lasers with one or more detectors.

Detecting the first velocity may, for example, be used to adapt the predetermined time of switching off the first laser and/or first detector as described above. The faster the particle move the shorter may the predetermined time of interrupting detection be. The controller may further be adapted to provide statistics based on the first velocity of different particles in order to provide an estimate whether there is a more or less chaotic movement or whether there is a preferred direction of particle movement. The smaller the distribution of first velocities is the higher is the likelihood that there is a preferred direction of particle movement. The estimate with respect particle movement may be used to refine determination of particle density.

A device like a mobile communication device (laptop, smart phone, PAD and the like) may comprise a laser sensor module as described above.

According to the further aspect a method of particle density detection is presented. The method comprises the steps of:

emitting by means of a first laser first laser light, receiving first reflected laser light in a first laser cavity of the first laser, the first reflected laser light being reflected by a particle receiving at least a part of the first laser light, determining a first self-mixing interference signal of an optical wave within the first laser cavity of the first laser, wherein the first self-mixing interference signal is caused by the first reflected first laser light reentering the first laser cavity, reducing multiple counts of the particle.

The steps of the method are not necessarily performed in the order as presented above.

According to a further aspect a computer program product is presented. The computer program product comprises code means which can be saved on at least one memory device of the laser sensor module according to any one of claims 1 to 13 or on at least one memory device of a device comprising the laser sensor module. The code means being arranged such that the method according to claim 14 can be executed by means of at least one processing device of the laser sensor module according to any one of claims 1 to 13 or by means of at least one processing device of the device comprising the laser sensor module. The memory device or the processing device may be comprised by the electrical driver and/or the controller and/or the device comprising the laser sensor module. A first memory device and/or first processing device of the device comprising the laser sensor module may interact with a second memory device and/or second processing device comprised by the laser sensor module.

It shall be understood that the laser sensor module according to any one of claims 1 to 13 and the method of claim 14 have similar and/or identical embodiments, in particular, as defined in the dependent claims.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings.

DETAILED DESCRIPTION OF EMBODIMENTS

Various embodiments of the invention will now be described by means of the Figures.

Self-mixing interference is used for detecting movement of and distance to an object. Background information about self-mixing interference is described in "Laser diode self-mixing technique for sensing applications", Giuliani, G.; Norgia, M.; Donati, S. & Bosch, T., Laser diode self-mixing technique for sensing applications, Journal of Optics A: Pure and Applied Optics, 2002, 4, S. 283-S. 294 which is incorporated by reference. Detection of movement of a fingertip relative to a sensor in an optical input device is described in detail in International Patent Application No. WO 02/37410. The disclosure regarding the detection of distance and movement in International Patent Application No. WO 02/37410 is incorporated by reference.

The principle of self-mixing interference is discussed based on the examples presented in International Patent Application No. WO 02/37410. A diode laser having a laser cavity is provided for emitting a laser, or measuring, beam. At its upper side, the device is provided with a transparent window across which an object, for example a human finger, is moved. A lens, for example, a plano-convex lens is arranged between the diode laser and the window. This lens focuses the laser beam at or near the upper side of the transparent window. If an object is present at this position, it scatters the measuring beam. A part of the radiation of the measuring beam is scattered in the direction of the illumination beam and this part is converged by the lens on the emitting surface of the laser diode and re-enters the cavity of this laser. The radiation re-entering the cavity of the diode laser induces a variation in the gain of the laser and thus in the intensity of radiation emitted by the laser, and it is this phenomenon which is termed the self-mixing effect in a diode laser.

The change in intensity of the radiation emitted by the laser can be detected by a photo diode, provided for this purpose, which diode converts the radiation variation into an electric signal, and electronic circuitry is provided for processing this electric signal.

Movement of the object relative to the measuring beam causes the radiation reflected thereby to undergo a Doppler shift. This means that the frequency of this radiation changes or that a frequency shift occurs. This frequency shift is dependent on the velocity with which the object moves and is of the order of a few kHz to MHz. The frequency-shifted radiation re-entering the laser cavity interferes with the optical wave, or radiation generated in this cavity, i.e. a self-mixing effect occurs in this cavity. Dependent on the amount of phase shift between the optical wave and the radiation re-entering the cavity, the interference will be constructive or negative, i.e. the intensity of the laser radiation is increased or decreased periodically. The frequency of the laser radiation modulation generated in this way is exactly equal to the difference between the frequency of the optical wave in the cavity and that of the Doppler-shifted radiation re-entering the cavity. The frequency difference is of the order of a few kHz to MHz and thus easy to detect. The combination of the self-mixing effect and the Doppler shift causes a variation in behavior of the laser cavity; especially its gain or light amplification varies. The impedance of the laser cavity or the intensity of the radiation emitted by the laser may, for example, be measured, and not only can the amount of movement of the object relative to the sensor (i.e. distance traveled) be evaluated, but the direction of movement can also be determined, as described in detail in International Patent Application No. WO 02/37410.

Figure 1:
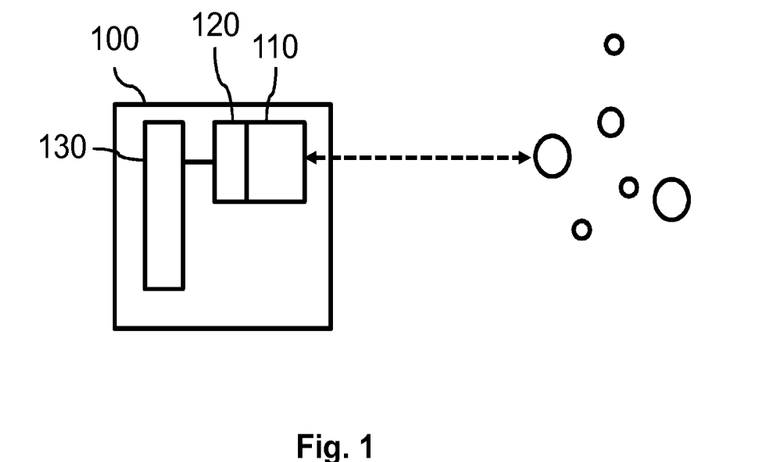
FIG. 1 shows a principal sketch of a first laser sensor module

FIG. 1 shows a principal sketch of a first laser sensor module 100. The first laser sensor module comprises a first laser 110 with an integrated first detector 120. The integrated first detector 120 is an integrated photodiode which is part of the layer structure of the first laser 110. The integrated photodiode determines oscillations of the optical wave within the first laser cavity of the first laser. The first laser sensor module 100 further comprises an electrical driver 130. The electrical driver 130 supplies electrical power to the first laser 110 in order to emit first laser light. The first laser 110 is in this case a Vertical Cavity Surface Emitting Laser (VCSEL) with integrated photodiode. The laser sensor module 100 is connected to a power supply (not shown) which provides the power which is modulated and supplied by means of the electrical driver 130. The electrical driver 130 provides an alternating order of different modulation schemes to the first laser 110. A constant current is provided in a first modulation scheme. A driving current with a triangular modulation scheme is provided in a second modulation scheme. The triangular modulation scheme may be used to determine a relative distance in combination with a velocity between the first laser 110 and the particle by means of the first self-mixing interference signal. The first modulation scheme may be used to determine a first velocity of the particle parallel to an optical axis of the first laser 110 which is indicated by the dashed line. The measurement signals of the first detector and information about the driving scheme applied by the electrical driver 130 may be received by a processing device (not shown) which may be arranged in a separate device or the laser sensor module may be integrated in a device comprising the processing device. The electrical driver 130 is further adapted to interrupt emission of first laser light for at least 4 ms such that the risk of double counts or multiple counts of the particle by means of the first self-mixing interference signal is avoided or at least reduced.

Figure 2:
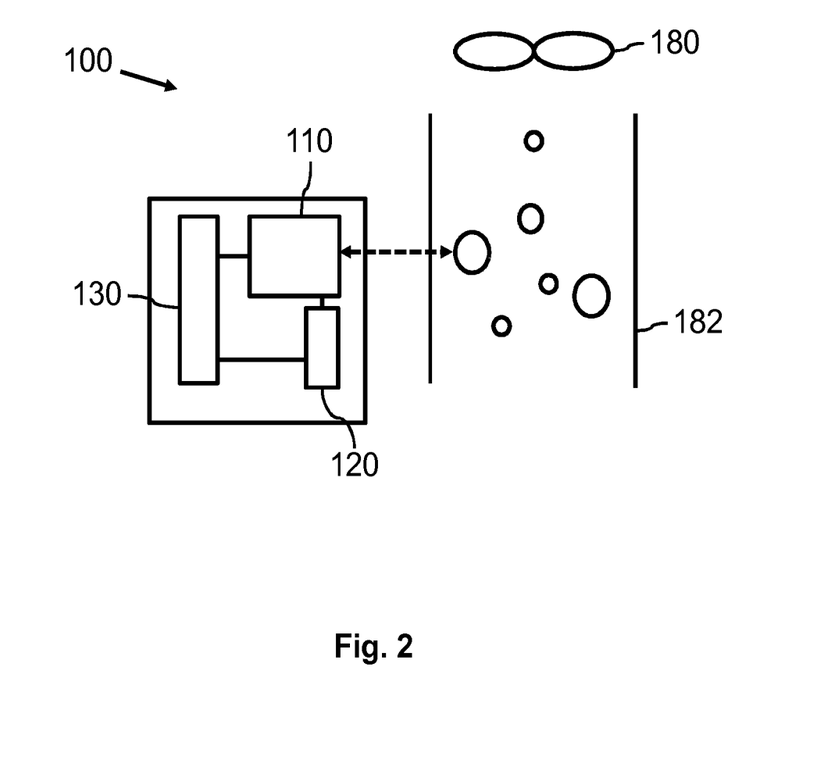
FIG. 2 shows a principal sketch of a second laser sensor module

FIG. 2 shows a principal sketch of a second laser sensor module 100. The second laser sensor module comprises a first laser 110. A first detector 120 is arranged as an external measurement circuit which determines the voltage across the first laser cavity or more generally the impedance of the first laser cavity which is influenced by the first self-mixing interference signal. The first laser sensor module 100 further comprises an electrical driver 130. The electrical driver 130 supplies electrical power to the first laser 110 in order to emit first laser light. The first laser 110 is in this case a side emitting semiconductor laser. The laser sensor module 100 is connected to a power supply (not shown) which provides the power which is modulated and supplied by means of the electrical driver 130. The electrical driver 130 provides a constant driving current such that first laser light is emitted by the first laser 110. The electrical driver 130 is further adapted to interrupt emission of first laser light for 1 ms such that the risk of double counts or multiple counts of the particle by means of the first self-mixing interference signal is avoided or at least reduced. The laser sensor module 100 further comprises a device for providing a defined particle velocity. The device for providing the determined particle velocity comprises a transparent tube 182 and a fan 180 for moving the gas or air within the tube. The velocity of the fan 180 is adapted to the time of interruption of emission of first laser light. Instead of a fan 180 a pump may be used in order to provide a defined particle velocity.

Alternatively, a heater/cooler may be arranged to provide air movement by means of convection. Information about air movement may be used in order to refine determination of particle density. A fan may, for example, be adapted to provide information about an air flow rate either to the laser sensor module or an external device which comprises a controller or processing device being adapted to determine particle density based on the first self-mixing interference signal and the additional information.

The laser sensor module 100 may alternatively or in addition be integrated in a device and the device can be moved in order to provide movement of the air around the device. Additional sensors like movement sensors may be used in order to determine movement of the device and indirectly of the air around the device. Information regarding the movement may be used in order to determine particle density.

Figure 3:
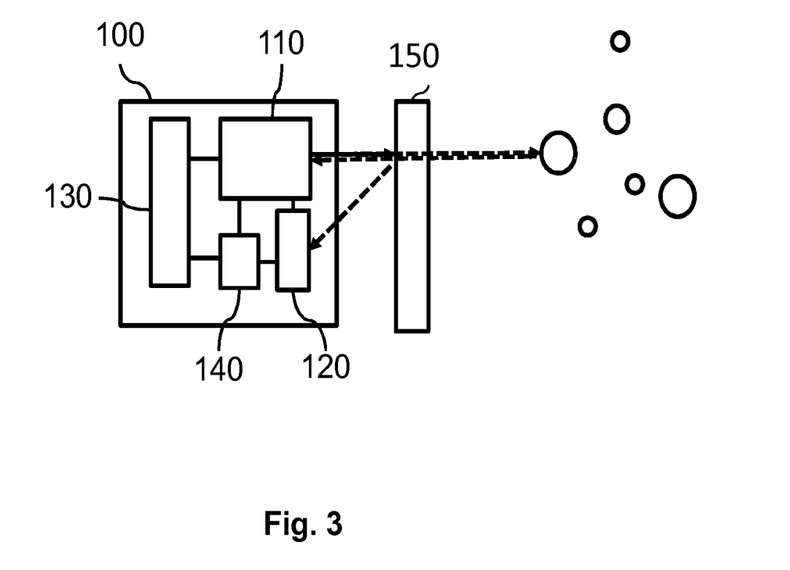
FIG. 3 shows a principal sketch of a third laser sensor module

FIG. 3 shows a principal sketch of a third laser sensor module 100. The third laser sensor module comprises a first laser 110 and an external first detector 120. The external first detector 120 is an external photodiode, meaning it is not integrated with the laser cavity but could be on the same laser chip. The third laser sensor module 100 further comprises an electrical driver 130, and a controller 140 and a first optical device 150. The controller 140 is connected to the first laser 110 or more precisely the first detector 120 and the electrical driver 130. The electrical driver 130 supplies electrical power to the first laser 110 in order to emit first laser light. The first laser 110 is in this case a Vertical Cavity Surface Emitting Laser (VCSEL) with integrated photodiode. The laser sensor module 100 is connected to a power supply (not shown) which provides the power which is modulated and supplied by means of the electrical driver 130. The electrical driver 130 provides a constant driving current. The controller 140 further receives information from the electrical driver 130. The first laser light emitted by the first laser 110 passes the first optical device 150 which is adapted to reflect a part of the first laser light to detector 120. The first optical device 150 may be, for example, a transparent plate. The first laser light comprises information about the modulation of the optical wave in the first laser cavity of the first layer 110. The controller 140 receives electrical signals provided by the first detector 120 which are caused by the first self-mixing interference signal. A particle can be detected within a range around the first focus region 155. The controller 140 is further adapted to switch off the first detector 120 for 4 ms after detecting the particle by means of a corresponding control signal upon detection of the particle. The particle is enabled to pass the beam of the first laser light during the interruption of the detection of first laser light such that double or multiple counts of the particle is avoided or at least reduced.

Figure 4:
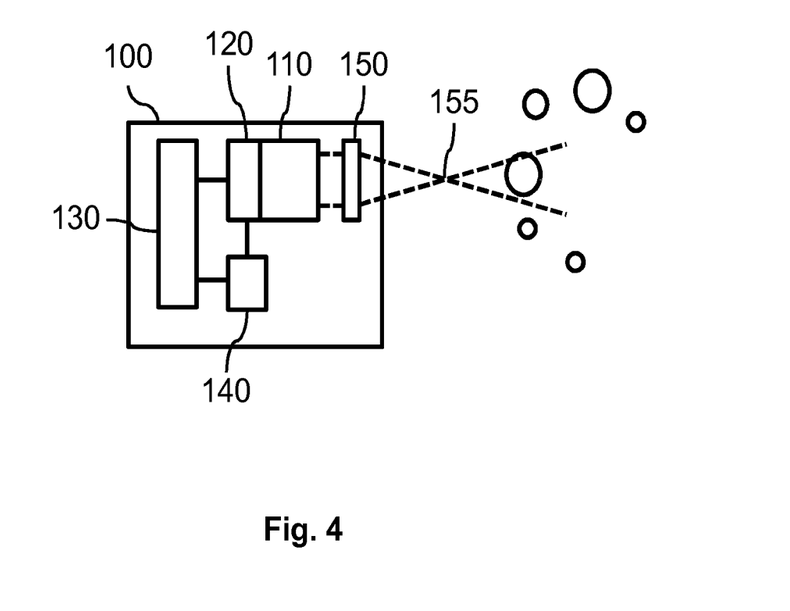
FIG. 4 shows a principal sketch of a fourth laser sensor module

FIG. 4 shows a principal sketch of a fourth laser sensor module 100. The fourth laser sensor module comprises a first laser 110 with an integrated first detector 120. The integrated first detector 120 is an integrated photodiode which is part of the layer structure of the first laser 110. The fourth laser sensor module 100 further comprises an electrical driver 130, and a controller 140 and a first optical device 150. The controller 140 is connected to the first laser 110 or more precisely the first detector 120 and the electrical driver 130. The electrical driver 130 supplies electrical power to the first laser 110 in order to emit first laser light. The first laser 110 is in this case a Vertical Cavity Surface Emitting Laser (VCSEL) with integrated photodiode. The laser sensor module 100 is connected to a power supply (not shown) which provides the power which is modulated and supplied by means of the electrical driver 130. The electrical driver 130 is adapted to provide a constant driving current. The controller 140 receives electrical signals provided by the first detector 120 which are caused by the first self-mixing interference signal. The controller 140 further receives information from the electrical driver 130. The first laser light emitted by the first laser 110 is focused by means of the first optical device 150 to a first focus region 155. A particle can be detected within a range around the first focus region 155. The controller 140 is further adapted to switch off the first laser 110 for 3 ms after detecting the particle by means of a corresponding control signal upon detection of the particle. The particle is enabled to pass the first focus region 155 during the interruption of the emission of first laser light such that double or multiple counts of the particle is avoided or at least reduced.

The first optical device 150 may for example comprises only one lens with the defined diameter rlens. The first self-mixing interference signal scales as (1−exp[−(rlens/wpupil)^2])^2, wherein wpupil is the waist parameter of a Gaussian beam of the first laser light at the lens pupil. The lens should have a certain minimal diameter in order to avoid signal loss due to vignetting of the backscattered or reflected beam of first laser light. A favorable embodiment would have a lens diameter >1.1 pupil diameter (this corresponds to 3 dB signal loss). Even better would be a lens >1.5 pupil diameter of the Gaussian beam (1 dB signal loss).

Figure 5:
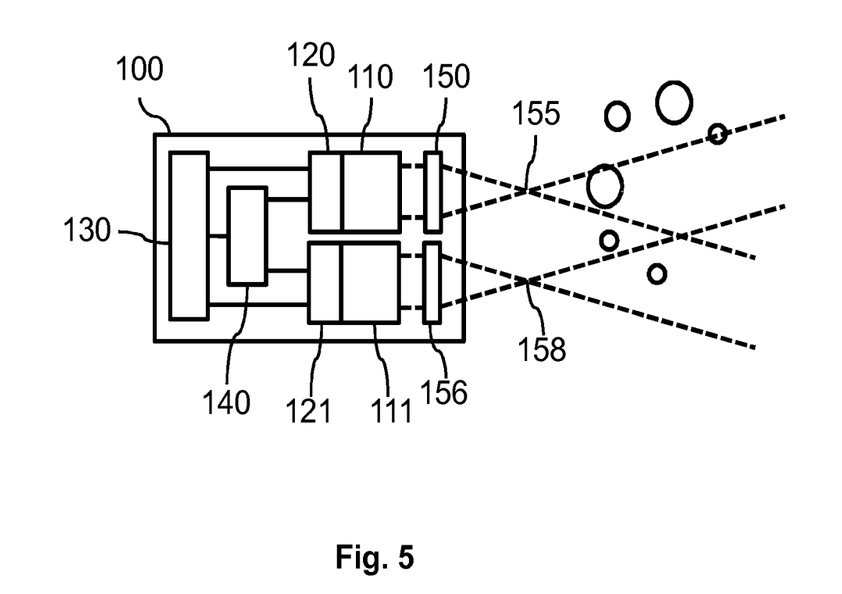
FIG. 5 shows a principal sketch of a fifth laser sensor module

FIG. 5 shows a principal sketch of a fifth laser sensor module 100. The fifth laser sensor module 100 comprises a first laser 110 with an integrated first detector 120 and a second laser 111 with an integrated second detector 121. The first laser 110 and the second laser 111 emit first and second laser light with the same wavelength. The first and second laser 110 and 111 may preferably emit laser light with wavelength above 750 nm in the infrared range of the spectrum, most preferably between 780 nm and 1300 nm of the wavelength spectrum. The fifth laser sensor module 100 comprises an electrical driver 130 which is adapted to provide a drive current to the first laser 110 and to the second laser 111. The electrical driver comprises a controller 140 which is connected to the first laser 110 and the second laser 111. The fifth laser sensor module 100 further comprises a first optical device 150 for focusing the first laser light to a first focus region 155. The fifth laser sensor module 100 further comprises a second optical device 156 for focusing the second laser light to the second focus region 158. The controller 140 receives electrical signals provided by the first detector 120 which are caused by the first self-mixing interference signal, and electrical signals provided by the second detector 121 which are caused by second self-mixing interference signal in the second laser cavity of the second laser 121. The controller 140 further receives information from the electrical driver 130. Parallel detection by means of the first laser 110 and the second laser 111 and corresponding detectors increases a detection volume. Increasing the detection volume may be helpful if the number of particles is rather low.

The particle count rate at relevant air pollution levels may be low in this case. This leads to long measurement time (>3 s) in order to give a reliable output of, for example, the PM 2.5 value. Using a third laser, fourth laser, fifth laser or more lasers would reduce measurement time in addition. The reduction of measurement time may increase the risk of detecting one particle by means of the first and the second self-mixing interference signal. The controller 140 may thus be adapted to reduce multiple counts of the particle by evaluation of at least the first self-mixing interference signal and the second self-mixing interference signal and optionally third, fourth, fifth etc. self-mixing interference signals. The reduction of multiple counts of the particle may be performed by means of a theoretical model of particle movement stored, for example, in the controller 140. The theoretical model may enable to determine coincidences of detection of one particle by means of the at least first and second laser (and optionally further lasers).

A laser sensor module 100 with two, three, four or more lasers and corresponding detectors may be used in order to decrease detection time by means of increased detection volume as described above. The detectors may be integrated like integrated photodiodes or external like external photodiodes or measurement circuits for detecting the impedance of the laser cavity. There may be one detector or for each laser or a detector for a group or even all of the lasers. The lasers may be arranged in an array on one semiconductor chip, wherein the semiconductor chip further comprises the detector or detectors. The laser sensor module 100 may comprise a controller 140. Analysis of the measurement data which can be performed by controller 140 may alternatively be performed by means of external computing devices. In this case is may be no controller 140 integrated in laser sensor module 100. Such a laser sensor module may be used independently from reduction of double or multiple counts especially in case of predetermined relative air movement (fan, moveable mirror etc.).

Figure 6:
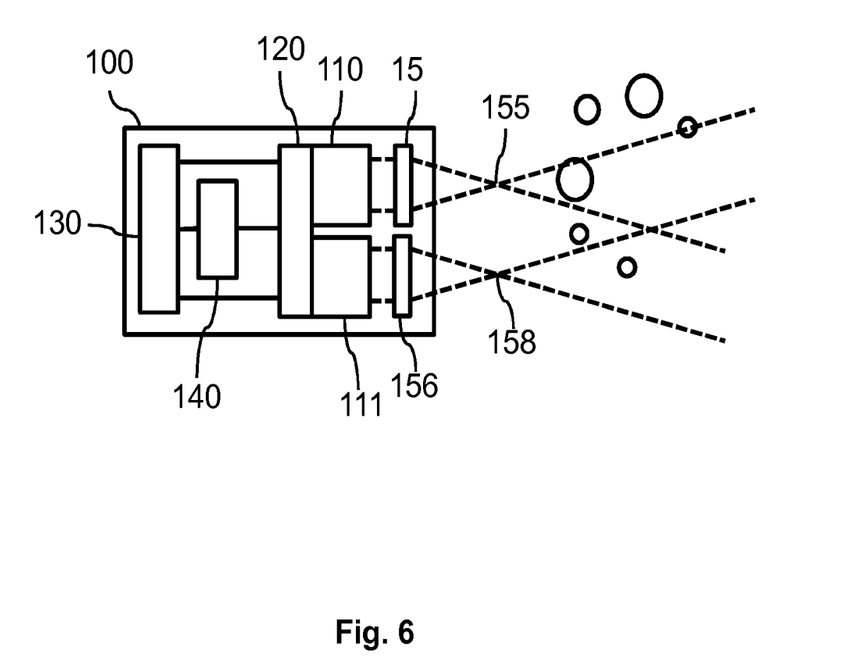
FIG. 6 shows a principal sketch of a sixth laser sensor module

FIG. 6 shows a principal sketch of a sixth laser sensor module 100. The configuration of the sixth laser sensor module 100 is nearly identical with the consideration of the fourth laser sensor module 100 described in FIG. 5. The difference is that instead of two detectors a single first detector 120 (photodiode) is used for the first and the second laser in combination with a single controller 140 which may comprise amplifier and ASIC for the digital signal processing of the self-mixing interference signals and control data or information provided by the electrical driver 130. As the particle density is low at normal air quality levels, most of the time the detector does not detect a particle and with the parallel arranged first and second laser 110, 111 (or more lasers in case of a laser array) the count rate will be increased but the chance of detecting two particles at the same instant of time is still very low. A disadvantage of this lay-out is that the background light on the photodiode signal increases, as only a single laser will provide the self-mixing signal of a particle, wherein the other lasers still illuminate the photodiode. This will increase the amount of noise on the self-mixing interference signal. The self-mixing interference signal is typically shotnoise limited. By doubling the intensity of light on the photodiode, the noise will increase by a factor of square root of two. The arrangement of two or even three or more lasers in parallel will result in more detected particles as described above, however the noise increase will in the end limit the number of lasers that can be used in parallel. So, effectively the gain per additional laser reduces.

Figure 7:
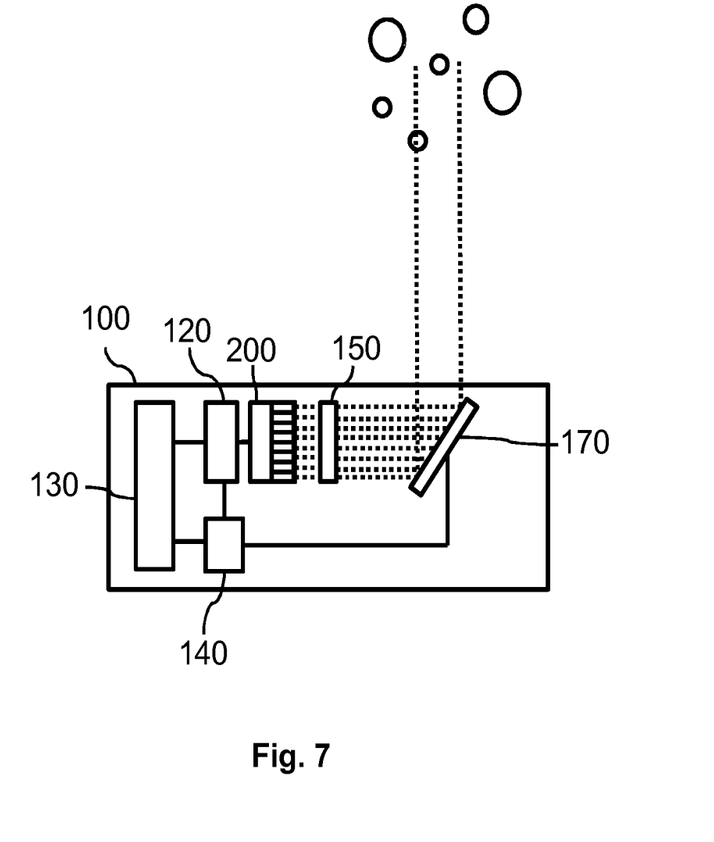
FIG. 7 shows a principal sketch of a seventh laser sensor module

FIG. 7 shows a principal sketch of a seventh laser sensor module 100. The seventh laser sensor module 100 comprises a laser array 200 with a first laser 110 and a multitude of other lasers emitting laser light. The seventh laser sensor module 100 further comprises one common first detector 120, an electrical driver 130, an controller 140, a first optical device 150 and a movable mirror 170. The controller 140 is connected to the first detector 120, the electrical driver 130 and the movable mirror 170. The electrical driver 130 supplies electrical power to the lasers of the laser array in order to emit laser light. Electrical driver 130 may provide a modulated driving current (e.g. rectangular drive current). The controller 140 receives electrical signals provided by the first detector 120 which are caused by the self-mixing interference signal which are caused by particles crossing a focus region of one of the lasers. The controller 140 further receives information from the electrical driver 130 and the movable mirror 170 in order to interpret the self-mixing interference signals measured by the first detector 120. The information provided by the electrical driver 130 may comprise the current provided at a determined moment in time. The controller 140 is further adapted to control movement of the movable mirror 170 by means of corresponding control signals. The control signals provided by controller 140 may determine angular velocity, amplitude of mirror movement and the like. The first optical device 150 is adapted to focus the laser light emitted by the different lasers of the laser array to different focus regions in order to increase the detection volume. The first optical device 150 may, for example, comprise an array of micro-lenses. The first optical device 150 may preferably be adapted to focus the laser light to respective focus region after being reflected by means of movable mirror 170.

In case the air movement is not controlled as, for example, by means of an arrangement as described in FIG. 2 (fan), the movable mirror 170 may be used to displace the spot or focus regions of the lasers. It may be favorable to choose the velocity of the movement of the focus regions higher than normal air speed velocities, 0.1 to 1 m/s. So it would be convenient to have a value of 5-20 m/s. In that case a value of the numerical aperture of the focusing lens of between 0.05-0.2 would be optimal, when particles above 300 nm should be detectable (numerical aperture is defined using the $1/e^2$ intensity value of the Gaussian beam's far field angular extend).

Figure 8:
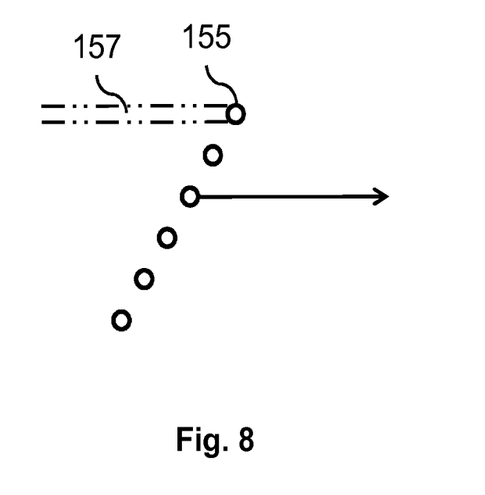
FIG. 8 shows a first embodiment of an array of focus regions

FIG. 8 shows a first embodiment of an array of focus regions which may be provided by means of a laser sensor module 100 as described in FIG. 7. The laser array 200 is in this case a linear array. Laser array 200, first optical device 150 and movable mirror 170 are arranged such that, for example, a trace 157 of the first focus region 155 does not overlap with traces of other focus regions. It may advantageous to have the line of the lasers not parallel to the scan direction such that each spot or focus region probes a different volume of space in order to increase a detection volume.

The lasers comprised by the laser array 200 may in an alternative embodiment be arranged in a two-dimensional laser array (e.g. square arrangement, hexagonal arrangement etc.). Similar as in the case of a linear arrangement the arrangement of the pattern of focus regions is preferably such that each laser spot or focus region probes its own volume in space as described with respect to the linear arrangement of FIG. 8.

The laser array 200 may comprise one semiconductor chip with one substrate and a multitude of VCSEL for emitting laser light. The corresponding detectors may be arranged as laser diodes which can be placed in a separate mesa (optionally with different diameter than the lasing mesas in the array). The separated mesa may be adapted to receive spontaneously emitted light from the VCSELs via reflections in the substrate. The modulation of such spontaneously emitted light by the self-mixing interference effect should be proportional to the laser power modulation but with a negative sign. The epitaxial structure can be the same for all mesas with the photodiodes being arranged nearer to the substrate.

The separated mesas may alternatively be adapted to receive laser light from the lasers in the array. This can be realized e.g. by a tailored back-reflection from, for example, the first optical device 150. In this arrangement it may be necessary to suppress the reflection of spontaneously emitted light via the substrate of the semiconductor chip e.g. by a blackened backside or by trench etching between the mesa.

The epitaxial structure could alternatively have the photodiodes on top of the mesas with this part etched away for the lasing mesas.

Figure 9:
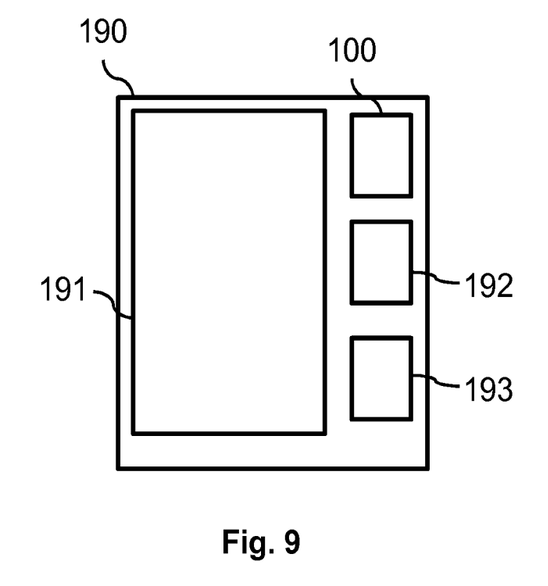
FIG. 9 shows a mobile communication device comprising a laser sensor module

FIG. 9 shows a mobile communication device 190 comprising a laser sensor module 100. The mobile communication device 190 comprises a user interface 191, a processing device 192 and a main memory device 193. The main processing device 192 is connected with the main memory device 193 and with laser sensor module 100. The main processing device 192 comprises at least a part of the functionalities of controller 140 which are described above. The main processing device 192 stores data related to particle detection in the main memory device 193. In an alternative embodiment it may also be possible that the main processing device 192 and the main memory device 193 are only used to prepare or adapt data provided by means of the laser sensor module 100 such that the data can be presented to a user of the mobile communication device 190 by means of user interface 191. The laser sensor module 100 is powered by means of power supply mobile communication device 190.

Figure 10:
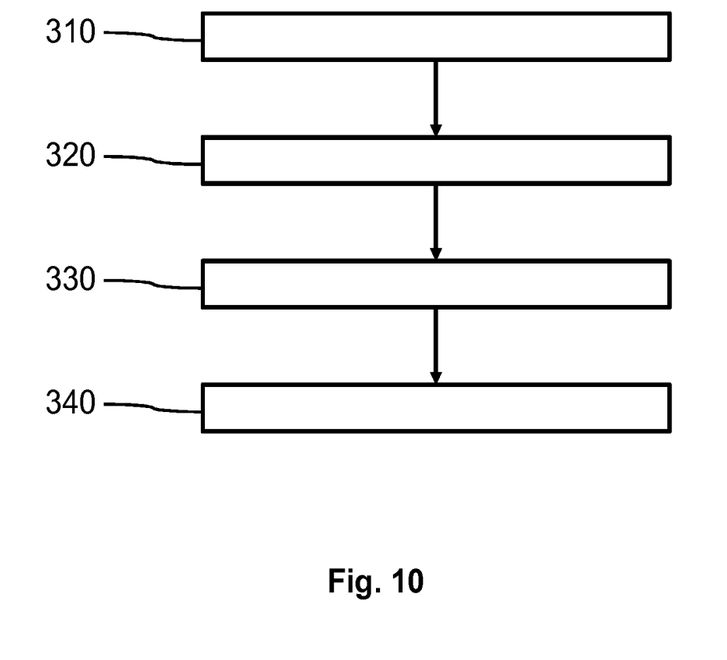
FIG. 10 shows a principal sketch of a method of detecting the particle density In the Figures, like numbers refer to like objects throughout. Objects in the Figures are not necessarily drawn to scale.

FIG. 10 shows a principal sketch of a method of detecting the particle density. In step 210 is first laser light emitted by means of a first laser 110. In step 220 first reflected laser light which is reflected by a particle receiving at least a part of the first laser light is reflected in a first laser cavity of the first laser 110. A first self-mixing interference signal 30 of an optical wave within the first laser cavity of the first laser 110 is detected in step 230. The first self-mixing interference signal 30 is caused by the first reflected laser light reentering the first laser cavity. Multiple counts of the particle are reduced in step 240.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 10 amplitude axis
20 time axis
30 self-mixing laser signal
40 amplitude reference
100 laser sensor module
110 first laser
111 second laser
120 first detector
121 second detector
130 electrical driver
140 controller
150 first optical device 155 focus region
156 second optical device
157 trace of focus region
156 second optical device
158 second focus region
170 first movable mirror
180 fan
182 transparent tube
190 mobile communication device
191 user interface
192 main processing device
193 main memory device
200 laser array
210 step of emitting laser light
220 step of receiving reflected laser light
230 step of determining a first self-mixing interference signal
240 step of reducing multiple counts

The invention claimed is:

1. A laser sensor apparatus comprising:
at least one first laser;
at least one first detector circuit;
at least one electrical driver,
wherein the first laser is arranged to emit a first laser light in reaction to signals provided by the at least one electrical driver,
wherein the at least one first detector circuit is arranged to detect a first self-mixing interference signal of an optical wave within a first laser cavity of the first laser,
wherein the first self-mixing interference signal is caused by first reflected laser light reentering the first laser cavity,
wherein the first reflected laser light is being reflected by a particle receiving at least a part of the first laser light,
wherein the laser sensor-apparatus is arranged to reduce multiple counts of the particle,
wherein the laser sensor-apparatus is arranged to interrupt detection of particles for a predetermined time period,
wherein the predetermined time period is selected such that multiple detection of the particle is reduced; and
a controller circuit,
wherein the controller circuit is arranged to evaluate the first self-mixing interference signal provided by the sensor in order to count the particle,
wherein the controller circuit is arranged to interrupt the detection of particles,
wherein the controller circuit is arranged to interrupt evaluation of the first self-mixing interference signal provided by the sensor for the predetermined time period,
wherein the controller circuit is arranged to generate a control signal upon detection of the particle,
wherein the controller circuit is arranged to interrupt the detection of particles for the predetermined time period after detection of the particle.

2. The laser sensor-apparatus according to claim 1, wherein the at least one electrical driver is arranged to periodically interrupt the detection of particles by means of the signals.

3. The laser sensor-apparatus according to claim 1,
wherein the controller circuit is arranged to transfer the control signal to the electrical driver,
wherein the electrical driver is arranged to interrupt emission of first laser light for the predetermined time period.

4. The laser sensor-apparatus according to claim 1 further comprising at least a first optical device, wherein the first optical device is arranged to focus the first laser light on a first focus region.

5. The laser sensor-apparatus according to claim 1 further comprising a laser array, the laser array comprising at least the first laser and a second laser,
wherein the second laser is arranged to enable independent detection of the particle using a second self-mixing interference signal,
wherein the second self-mixing interference signal is caused by second laser light emitted by the second laser,
wherein the controller circuit is arranged to reduce multiple counts of the particle by evaluation of at least the first self-mixing interference signal and the second self-mixing interference signal.

6. The laser sensor-apparatus according to claim 5,
wherein the laser sensor-apparatus comprises at least a first optical device,
wherein the first optical device is arranged to focus at least the first laser light on a first focus region and is arranged to focus the second laser light on a second focus region such that a detection volume for detecting the particle density is increased.

7. The laser sensor-apparatus according to claim 6,
wherein the laser sensor-apparatus comprises at least a first movable mirror arranged to reflect at least the first and the second laser light such that at least the first and the second focus regions move,
wherein the first movable mirror is arranged to move at least the first and the second focus regions such that traces of the first and the second focus regions do not overlap.

8. The laser sensor-apparatus according to claim 5,
wherein the first detector circuit is arranged to detect the first self-mixing interference signal and the second self-mixing interference signal,
wherein the controller circuit is arranged to switch off at least a portion of the laser array based on the particle density.

9. The laser sensor-apparatus according to claim 5,
wherein the controller circuit is arranged to determine a projection of a first velocity of the particle along an optical axis parallel to the first or second laser light based on the first self-mixing interference signal or second self-mixing interference signal,
wherein the controller circuit is arranged to reduce multiple counts of the particle using the first velocity.

10. A method of particle density detection, the method comprising:
emitting a first laser light using a first laser;
receiving a first reflected laser light in a first laser cavity of the first laser, wherein the first reflected laser light is reflected by a particle, the particle receiving at least a part of the first laser light;
determining a first self-mixing interference signal of an optical wave within the first laser cavity, wherein the first self-mixing interference signal is caused by the first reflected first laser light reentering the first laser cavity;
reducing multiple counts of the particle by interrupting detection of particles for a predetermined time period, wherein the predetermined time period is selected such that multiple detection of the particle is reduced;
evaluating the first self-mixing interference signal in order to detect the particle;

generating a control signal upon detection of the particle; and interrupting the detection of particles for the predetermined time period after detection of the particle.

11. A computer program comprising code arranged to perform all the steps of claim 10 when the program is run on a computer.

12. The method of claim 10, wherein a first optical device is arranged to focus the first laser light on a first focus region.

13. The method according to claim 10 further comprising, emitting a second laser light using a second laser;

receiving a second reflected laser light in a second laser cavity of the second laser, wherein the second reflected laser light is reflected by a particle, the particle receiving at least a part of the second laser light;

determining a second self-mixing interference signal of an optical wave within the second laser cavity, wherein the second self-mixing interference signal is caused by the second reflected second laser light reentering second first laser cavity; and reducing multiple counts of the particle by evaluation of at least the first self-mixing interference signal and the second self-mixing interference signal.

14. The method according to claim 13 further comprising, focusing at least the first laser light on a first focus region and focusing the second laser light on a second focus region such that a detection volume for detecting the particle density is increased.

15. The method according to claim 14 further comprising, moving a movable mirror such that at least the first and the second focus regions such that traces of the first and the second focus regions do not overlap, wherein the first movable mirror is arranged to reflect at least the first and the second laser light such that at least the first and the second focus regions move.

16. The method according to claim 13 further comprising, determining a projection of a first velocity of the particle along an optical axis parallel to the first or second laser light based on the first self-mixing interference signal or second self-mixing interference signal; and reducing multiple counts of the particle using the first velocity.

\* \* \* \* \*